3,364,272
PRODUCTION OF PERCHLOROETHYLENE
John W. Ager, Jr., Princeton, N.J., assignor to FMC Corporation, New York, N.Y., a corporation of Delaware
No Drawing. Filed Nov. 29, 1965, Ser. No. 510,380
4 Claims. (Cl. 260—654)

This invention relates to the production of perchloroethylene and more particularly it relates to the production of perchloroethylene by catalytic reaction of carbon tetrachloride and carbon monoxide.

Perchloroethylene is an organic solvent widely used by the dry cleaning industry. This solvent is commercially produced either by the chlorination of propane or by the pyrolysis of carbon tetrachloride. The chlorination process has the disadvantage that eight moles of hydrogen chloride are produced for each mole of perchloroethylene while the pyrolysis process requires reaction temperatures of the order of 800° C.

It is an object of this invention to provide a process for the production of perchloroethylene under moderate reaction conditions without the production of hydrogen chloride. Another object is to provide a process for the production of perchloroethylene under moderate conditions in which the by-product is useful in preparing one of the starting materials. These and other objects will become apparent from the following description of this invention.

It has now been discovered that perchloroethylene can be produced in good yield by reacting about 1 mole of carbon tetrachloride with at least about 1 mole of carbon monoxide at a temperature of about 150–300° C. and a pressure of about 100–1500 p.s.i.g. in the presence of at least 10% by weight, based on the carbon tetrachloride, of a catalyst containing 1 part by weight of tungsten hexachloride or molybdenum pentachloride in combination with about 1–20 parts by weight of aluminum chloride or calcium chloroaluminate.

The novel reaction of this invention proceeds in accordance with the following equation:

$$2CCl_4 + 2CO \rightarrow CCl_2 = CCl_2 + 2COCl_2$$

The phosgene produced in this reaction is useful in the preparation of carbon tetrachloride according to the equation:

$$2COCl_2 \rightarrow CCl_4 + CO_2$$

as described in my copending applications Ser. No. 391,313, filed Aug. 21, 1964 and Ser. No. 507,659, filed Nov. 15, 1965.

Although theoretically the equation for the reaction of this invention calls for equal molar amounts of carbon tetrachloride and carbon monoxide, it has been found that best results are obtained by charging excess carbon monoxide under pressure. Preferably at least about 6 moles of carbon monoxide are present per mole of carbon tetrachloride.

The reaction takes place at temperatures between about 150–300° C. At temperatures below about 150° C. the conversion is unsuitably low. At temperatures above about 300° C. high chlorine losses are encountered. Preferably temperatures of about 200–250° C. are employed. In general reaction times not in excess of about 15 minutes are sufficient. Under preferred conditions, reaction times of about 3 to 5 minutes are suitable.

The reaction is carried out under a pressure of at least about 100 p.s.i.g. At pressures below about 100 p.s.i.g., the conversion of carbon tetrachloride is unsuitably low. At pressures of 400–800 p.s.i.g. conversion of carbon tetrachloride vary between about 60 and 90% depending upon the residence time. Higher pressures give even higher conversions but cause an inordinate increase in the cost of equipment necessary to withstand the pressures. Pressures as high as 1500 p.s.i.g. have been used successfully.

The catalyst used in accordance with this invention is tungsten hexachloride or molybdenum pentachloride in combination with aluminum chloride or calcium chloroaluminate. The two components of the catalyst composition act synergistically. Neither aluminum chloride, calcium chloroaluminate nor the chloride of tungsten or molybdenum alone will catalyze the reaction in good yield. However, when about 1 to 20 parts by weight of aluminum chloride or calcium chloroaluminate are used per part of tungsten hexachloride or molybdenum pentachloride, in total amounts of catalyst as low as about 10% by weight, based on the carbon tetrachloride, substantial conversion is obtained in a short time. Preferably the catalyst composition should contain 5 to 10 parts by weight of aluminum chloride or calcium chloroaluminate per part of tungsten hexachloride or molybdenum pentachloride. The preferred catalyst composition is tungsten hexachloride and aluminum chloride.

It should be noted that tungsten or molybdenum can be added to the reaction mixture in any form which will react with carbon tetrachloride to form the chloride catalyst, for example as the oxide. During the reaction chlorine is split off from the carbon tetrachloride and reacts with the tungsten or molybdenum to form tungsten hexachloride or molybdenum pentachloride.

The reaction should be carried out in the presence of at least about 10% by weight catalyst based on the carbon tetrachloride. When smaller amounts are used the conversion of carbon tetrachloride is unsuitably low. For good conversions at least about 25% catalyst based on the carbon tetrachloride should be used and preferably about 50–200%. There is no upper limit on the amount of catalyst employed other than economic considerations. Catalyst loadings as high as about 1000% have been used successfully.

The process of this invention requires lower capital and operating costs than present commercial processes for producing perchloroethylene. These advantages are due to the use of moderate temperature and pressure conditions and the elimination of undesired by-products such as hydrochloric acid.

The following examples, illustrating the novel process described herein, are given without any intention that the invention be limited thereto. All parts and percentages are by weight.

Example 1

A mixture of 6 parts $AlCl_3$, 3 parts $WCl_6$ and 10 parts $CCl_4$ was placed in a bomb. Carbon monoxide was added to a pressure of 400 p.s.i.g. (approx. 11 parts) and the mixture was heated at 200° C. for 15 min. with rocking. The product was analyzed by mass spectrography and found to contain:

| | Parts |
|---|---|
| $CCl_4$ | 1.2 |
| $C_2Cl_6$ | 1.9 |
| $COCl_2$ | 4.8 |
| $C_2Cl_4$ | 3.3 |

The $CCl_4$ conversion was 87%, the yield of $CCl_2=CCl_2$ was 73% based on the $CCl_4$ converted, and the recovery of chlorine values was 98%.

Example 2

Example 1 was repeated except that only 200 p.s.i.g. CO was employed. The mixture was heated at 300° C. for 15 min. The product was analyzed by mass spectrography and found to contain:

| | Parts |
|---|---|
| $CCl_4$ | 2.0 |
| $COCl_2$ | 3.5 |
| $C_2Cl_4$ | 2.3 |

The CCl$_4$ conversion was 89%, the yield of CCl$_2$=CCl$_2$ was 54% based on the CCl$_4$ converted, and the recovery of chlorine values was 68%.

Example 3

A charge of 3 parts AlCl$_3$, 1.5 parts WCl$_6$, 10 parts CCl$_4$ and 400 p.s.i.g. CO was heated in a bomb at 200° C. for 15 min. The product was analyzed by mass spectrography and found to contain:

| | Parts |
|---|---|
| CCl$_4$ | 0.5 |
| C$_2$Cl$_6$ | 0.7 |
| COCl$_2$ | 5.0 |
| C$_2$Cl$_4$ | 2.8 |

The CCl$_4$ conversion was 95% and the yield of $$CCl_2=CCl_2$$

was 53% based on the CCl$_4$ converted.

Example 4

A charge of 3 parts AlCl$_3$, 1.5 parts WCl$_6$, 10 parts CCl$_4$ and 400 p.s.i.g. CO was heated in a bomb at 200° C. for 7.5 min. The product was analyzed by mass spectrography and found to contain:

| | Parts |
|---|---|
| CCl$_4$ | 1.7 |
| C$_2$Cl$_6$ | 1.9 |
| COCl$_2$ | 4.5 |
| C$_2$Cl$_4$ | 2.1 |

The CCl$_4$ conversion was 83% and the yield of $$CCl_2=CCl_2$$

was 47% based on the conversion.

Example 5

Calcium chloroaluminate was prepared by heating 11.1 parts anhydrous calcium chloride and 26.6 parts anhydrous aluminum chloride in a sealed autoclave at 300° C. for 36 hours. The solid calcium chloroaluminate product was crushed to a powder and heater to 305° C. in a sublimator at atmospheric pressure to remove the excess aluminum chloride.

A charge of 21 parts calcium chloroaluminate, 3 parts WCl$_6$, 10 parts CCl$_4$ and 400 p.s.i.g. CO was heated in a bomb at 300° C. for 15 min. The product was analyzed by mass spectrography and found to contain:

| | Parts |
|---|---|
| CCl$_4$ | 4.6 |
| COCl$_2$ | 3.2 |
| C$_2$Cl$_4$ | 3.5 |

The CCl$_4$ conversion was 54% and the yield of $$CCl_2=CCl_2$$

was 71% based on the conversion.

As will be apparent to those skilled in the art numerous modifications and variations of the embodiments illustrated may be made without departing from the spirit of the invention or the scope of the following claims.

What is claimed is:

1. A method of producing perchloroethylene which comprises contacting 1 mole of carbon tetrachloride with at least 1 mole of carbon monoxide at a temperature of 150–300° C. and a pressure of at least 100 p.s.i.g. in the presence of at least 10% by weight, based on the carbon tetrachloride, of a catalyst containing 1 part by weight of tungsten hexachloride or molybdenum pentachloride in combination with 1–20 parts by weight of aluminum chloride or calcium chloroaluminate.

2. The method of claim 1 in which the reaction is carried out at a temperature of 200–250° C. and a pressure of 300–800 p.s.i.g.

3. The method of claim 2 in which at least 6 moles of carbon monoxide are present for each mole of carbon tetrachloride.

4. The method of claim 2 in which the reaction is carried out in the presence of at least 25% by weight, based on the carbon tetrachloride, of a catalyst containing 1 part of tungsten hexachloride and 5–10 parts of aluminum chloride.

References Cited

UNITED STATES PATENTS

| 1,930,350 | 12/1931 | Strosacker et al. | 260—658 |
| 3,061,652 | 6/1957 | Cayton et al. | 260—658 |

LEON ZITVER, *Primary Examiner.*

J. A. BOSKA, *Assistant Examiner.*